United States Patent
Miyata et al.

[11] Patent Number: 6,111,326
[45] Date of Patent: Aug. 29, 2000

[54] CONTROL CIRCUIT FOR OPENING/CLOSING DEVICE IN A VEHICLE

[75] Inventors: Yukio Miyata; Yutaka Sekino; Shigeru Hatakeyama; Atsushi Sakagami, all of Kanagawa-ken, Japan

[73] Assignee: Nissan Motor Co., Ltd., Kanagawa-ken, Japan

[21] Appl. No.: 09/052,925

[22] Filed: Apr. 1, 1998

[30] Foreign Application Priority Data

Apr. 2, 1997 [JP] Japan .................................... 9-084124
Jun. 3, 1997 [JP] Japan .................................... 9-145509

[51] Int. Cl.[7] .................................................. H02P 1/22
[52] U.S. Cl. ........................ 307/10.1; 361/166; 318/280; 307/115
[58] Field of Search ..................... 307/9.1, 10.1, 307/113, 114, 115, 125; 361/139, 160, 166, 167, 170; 318/293, 280–300, 445–487

[56] References Cited

U.S. PATENT DOCUMENTS

| 4,394,605 | 7/1983 | Terazawa | 315/280 |
|---|---|---|---|
| 5,121,038 | 6/1992 | Yamamura et al. | 318/280 |
| 5,138,182 | 8/1992 | Kokubu | 307/10.1 |
| 5,578,912 | 11/1996 | Mizuta et al. | 318/434 |
| 5,731,675 | 3/1998 | McCarthy | 318/469 |
| 5,754,021 | 5/1998 | Kojima | 318/466 |

FOREIGN PATENT DOCUMENTS 0 424 907 A2  10/1990  European Pat. Off. .
0 424 907 A3  10/1990  European Pat. Off. .

OTHER PUBLICATIONS

Patent Abstract of Japan; Publication No. 06351078; Dated Dec. 22, 1994.

*Primary Examiner*—Jeffrey Gaffin
*Assistant Examiner*—Kim Huynh
*Attorney, Agent, or Firm*—McDermott, Will & Emery

[57] ABSTRACT

There is provided a control circuit which can perform a control of opening and closing an opening/closing device, a sun roof in a vehicle, or the like. Usually, an I UP direction current is supplied to a motor 9 according to an ON-operation by an UP switch 3, and an I DOWN direction current is supplied to a motor 9 according to an ON-operation by a DOWN switch 5. If any failures occur, even if the I UP direction current is supplied to the motor 9 when the UP switch 3 is not on-operated, in accordance with the ON-operation of the DOWN switch 5, the current is switched over to the I DOWN direction, and then, is supplied to the motor 9.

2 Claims, 12 Drawing Sheets

CONTROL CIRCUIT FOR OPENING/ CLOSING DEVICE IN A VEHICLE

BACKGROUND OF THE INVENTION

1. Field of the Invention

The present invention relates to a control circuit for an opening/closing device in a vehicle and, in particular, to a control circuit for an opening/closing device such as a power window, a sun roof and the like which are equipped in a vehicle.

2. Description of the Related Art

Figure 1A:
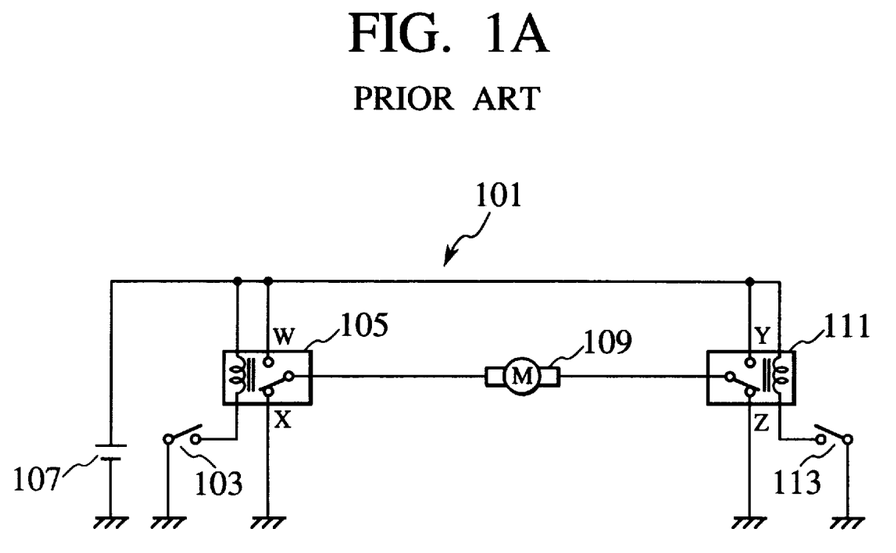
FIG. 1A is a circuit diagram showing a normal state of a conventional control circuit 101 of a window.

FIG. 1A is a circuit diagram showing a configuration of a conventional control circuit 101 of a power window in a vehicle.

The control circuit 101 is provided with an UP switch 103 which is operated to raise up a glass window of a land vehicle, a DOWN switch 113 which is operated to lower the window glass, a motor 109 which switches over a rotational direction thereof in accordance with a flowing direction of current, a battery power source 107 which stores and supplies an electric energy generated by a power generator equipped in the land vehicle, and an UP relay 105 and a DOWN relay 111 which switches over a contact when a direct current from the battery power source 107 is supplied to an interior coil.

When the UP switch 103 is turned on by a passenger of the land vehicle, a contact of the UP relay 105 is switched over from a state of being in contact with an X side to a state of being in contact with an W side. In this case, the current from the battery power source 107 flows through a terminal W of the UP relay 105, and flows to an I UP direction going from the motor 109, a terminal Z of the DOWN relay 111 to an earth. And then, the motor 109 is rotated in a direction of raising up the glass window in accordance with the flowing direction of current. Thus, during an ON-state of the UP switch 103, the motor 109 continues to rotate so that the glass window is raised up.

On the other hand, when the DOWN switch 113 is turned on by a passenger of the land vehicle, a contact of the DOWN relay 111 is switched over from a state of being in contact with an Z side to a state of being in contact with on an Y side. In this case, the current from the battery power source 107 flows through a terminal Y of the DOWN relay 111, and flows to an I DOWN direction going from the motor 109 and a terminal X of the UP relay 105 to an earth. And then, the motor 109 is rotated in a direction of lowering the glass window in accordance with the flowing direction of current. Thus, during an ON-state of the DOWN switch 113, the motor 109 continues to rotate so that the glass window is lowered.

Figure 1B:
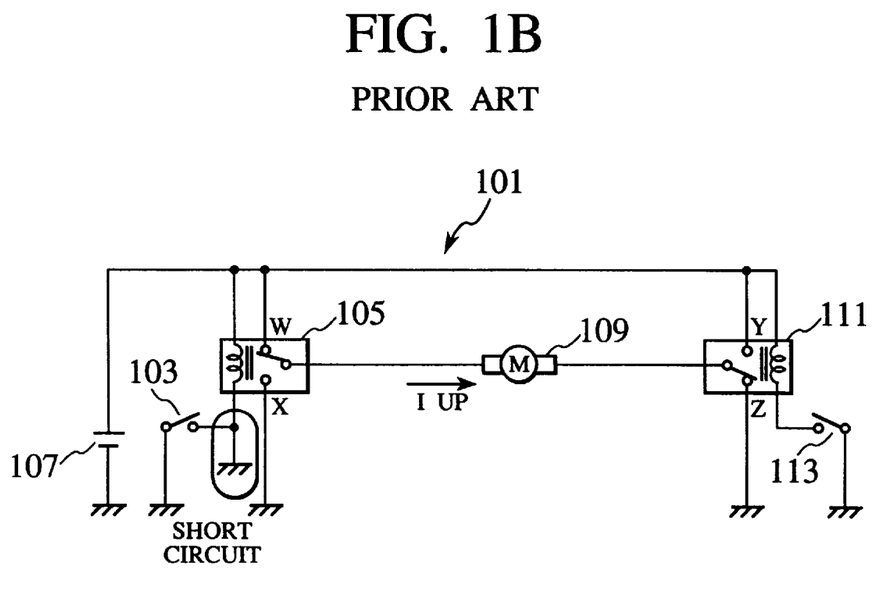
FIG. 1B is a circuit diagram showing a case where a short circuit occurs in a connecting line between an UP relay 105 and an UP switch 103 of the conventional control circuit 101 of a window.

FIG. 1B is a circuit diagram showing an equivalent circuit in the case where a connecting line between the UP relay 105 and the UP switch 103 short-circuits due to any failures, or in the case where the Up relay 105 is fixed to the terminal W side.

In this case, the connecting line between the UP relay 105 and the UP switch 103 short-circuits; for this reason, this is the same state as the UP switch 103 is turned on. Therefore, the contact of the UP relay 105 is kept at a state of being in contact with the W side. Further, the I UP direction current flows through the motor 109, and then, the motor 109 is rotated to a direction of raising up the glass window.

At this time, when the down switch 113 is turned on by a passenger of the land vehicle, the terminal of the DOWN relay 111 is switched over from a state of being in contact with an Z side to a state of being in contact with on an Y side. However, both terminals of the motor 109 become the same potential; for this reason, no current flows through the motor 109. As a result, even when the DOWN switch 113 is turned, the motor 109 is not rotated; for this reason, the glass window is not lower.

As described above, there has arisen a problem that the glass window is not lowered in the case where a connecting line between the UP relay 105 and the UP switch 103 short-circuits, or in the case where the Up relay 105 is fixed to the terminal W side.

Figure 2:
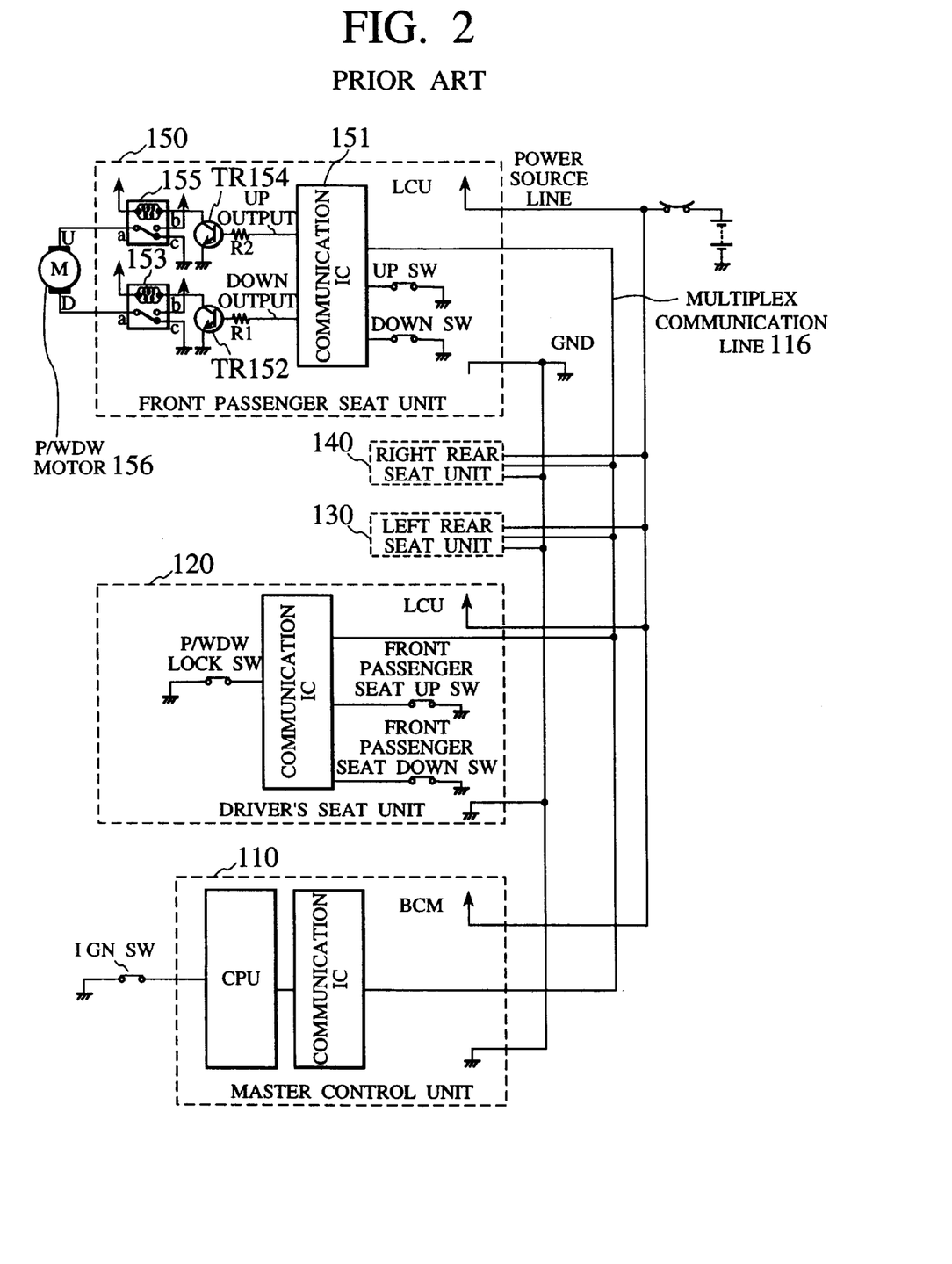
FIG. 2 is a circuit diagram showing a conventional power window system.

Moreover, a power window system as shown in FIG. 2 has been known as another related art. FIG. 2 is a diagram showing a circuit configuration for open/close driving a window provided in a door on a front passenger seat side.

The power window system is provided with a master control unit 110 which performs control relative to communication and a power window, units 120, 130, 140 and 150, which control a motor for open/close driving a window provided in a door on the driver's seat side in accordance with a switch signal outputted from the master control unit 110. The power window system is constructed in a manner that the master control unit 110 and respective seat units 120, 130, 140 and 150 are mutually connected by means of a multiplex communication line 116, and these units make a communication of a switch state, a switch signal or the like.

First, when a driver assistant seat. DOWN_SW (switch) on the driver's seat unit 120 provided the driver's seat side is operated by a driver, the driver's seat unit 120 transmits an ON-switch signal by the DOWN_SW to the master control unit 110 via the multiplex communication line 116. Next, the driver's seat unit 120 transmits an OFF-switch signal by a P/WDW lock SW (a power window lock switch) to the master control unit 110 via the multiplex communication line 116.

On the other hand, the master control unit 110 makes a decision that a window operation allowable condition of the front passenger seat is satisfied because the P/WDW lock SW provided on the driver's seat unit 120 is in an OFF-state and an IGN_SW (an ignition switch) is in an ON-state, on the basis of the switch signal received via the multiplex communication line 116. And then, the master control unit 110 transmits an open-switch signal for open-driving a P/WDW motor 156 provided on the front passenger seat unit 150 via the multiplex communication line 116.

In the front passenger seat unit 150, a communication IC 151 receives the open-switch signal from the master control unit 110 via the multiplex communication line 111. Based on the received open-switch signal, the communication IC 151 outputs High to a base input of a transistor TR 152 to turn On the transistor 152. As a result, a solenoid coil of a driving relay 153 is excited, and then, a contact "a" of the driving relay 153 is connected to a contact "b" thereof. Further, a power is supplied to a terminal D of the P/WDW motor 156, while the other terminal U thereof is ground because a contact "a" of a driving relay 155 is connected to a contact "c" thereof. As a result, an open-drive current direction from the terminal D to the terminal U flows through the P/WDW motor 156 so that a door window on the driver assistant seat side is open-driven.

Further, when a DOWN_SW attached to the communication IC 151 of the front passenger seat unit 150 is turned ON, the communication IC 151 of the front passenger seat unit 150 once transmits an open-switch signal for open-driving the power window on the front passenger seat side to the master control unit 110 via the multiplex communication line 116.

However, according to the aforesaid conventional power window system, in the case where a fault occurs in the multiplex communication line due to any causes and a communication is not made between units, for example, the open-switch signal is not transmitted from the master control unit 110 to the communication IC 151 of the front passenger seat unit 150. As a result, there has arisen that the window is not open-driven by the front passenger seat unit 150.

SUMMARY OF THE INVENTION

The present invention has been achieved with taking the aforesaid problem arisen in the conventional art into consideration. An object of the present invention is to provide a control circuit of an opening/closing device in a vehicle which can contribute to improvement of reliability.

Further, another object of the present invention is to provide a control circuit for an opening/closing device in a vehicle which can forcedly open-drive an opening/closing device even if a fault occurs in a multiplex communication system.

To achieve the above object, a control circuit is provided for the opening/closing device in a vehicle. The vehicle has a motor for driving the opening/closing device and a first contact switches over a first terminal of the motor from ground to a power source in accordance with an ON-operation of an opening switch for opening the opening/closing device. A second contact switches over a second terminal of the motor from ground to the power source in accordance with an ON-operation of a closing switch for closing the opening/closing device. In addition, an interlocking switch forcedly switches over the second terminal of the motor to ground when the opening switch performs the ON-operation.

The invention itself, together with further objects and attendant advantages, will be understood by reference to the following detailed description taken in conjunction with the accompanies drawings.

DETAILED DESCRIPTION OF THE PREFERRED EMBODIMENTS

Preferred embodiments of the present invention will be described below with reference to the accompanying drawings. Japanese Patent Applications Ser. Nos. 9-84124 and 9-145509 are incorporated by reference.

(First Embodiment)

FIG. 3A to FIG. 3C and FIG. 4A and FIG. 4B show a circuit diagram of a control circuit of a power window system for a land vehicle according to a first embodiment of the present invention.

In these figures, an UP switch 3 is operated when raising up (closing) a glass window (not shown), and a DOWN switch 5 is a switch which is operated when lowering (opening) the glass window. These UP switch 3 and DOWN switch 5 are provided on a side portion of a door, and are operated by a passenger of the land vehicle as the need arises. Further, the DOWN switch 5 is connected with an interlocking switch 7 via a link 1, and opens and closes a contact of the interlocking switch 7 in accordance with a switch operation of the DOWN switch 5.

A motor 9 is rotated in a forward and reverse direction in accordance with a current (close-drive current) flowing to an UP direction and a current (open-drive current) flowing to a DOWN direction. The motor 9 is connected with the glass window by means of an arm (not shown), and the glass window can be raised up and lowered by the rotation of the motor 9. Further, in order to detect full close and full open states of the glass window, a detector (not shown) is provided. In this case, the detector may detect a position of the glass window with the use of an encoder or the like, or may detect full close and full open states of the glass window with the use of a limit switch or the like. Furthermore, the motor 9 may be controlled so as to be stopped rotating in the case where the full close and full open states of the glass window are detected.

A battery power source 15 stores and supplies an electric energy generated by a power generator equipped in a land vehicle. An UP relay 11 and a DOWN relay 13 are constructed so as to switch over their contacts when a direct current power from the battery power source 15 is supplied to coils of their interiors.

Next, an operation when the aforesaid control circuit 1 is in a normal state will be described below with reference to FIG. 3A to FIG. 3C.

Figure 3A:
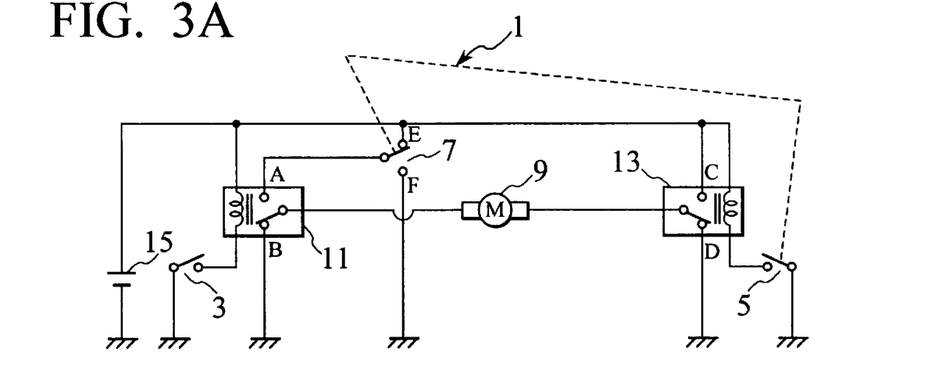
FIG. 3A is a circuit diagram showing a normal state of a control circuit 1 of a window according to a first embodiment of the present invention.

FIG. 3A is a circuit diagram when the UP switch 3 and the DOWN switch 5 are in an off-state.

When the UP switch 3 and the DOWN switch 5 are in an off-state, a contact of the UP relay 11 is kept at a state of being in contact with a B side; on the other hand, a contact of the DOWN relay 13 is kept at a state of being in contact with a D side. In this case, the motor 9 is in a state that a current does not flow therethrough because it is not connected with the battery power source 15; therefore, the motor 9 is not rotated.

Figure 3B:
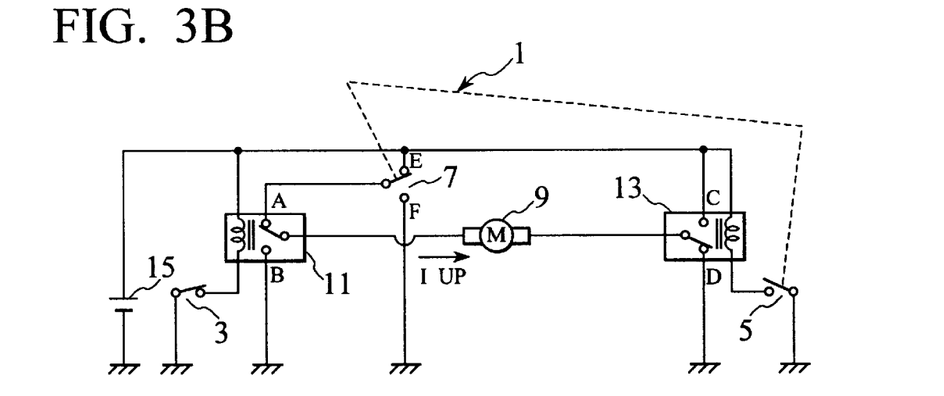
FIG. 3B is a circuit diagram when turning on an UP switch 3 of the control circuit 1 of the window according to the first embodiment.

FIG. 3B is a circuit diagram when the UP switch 3 is in an ON-state.

When the UP switch 3 is turned on by a passenger of a land vehicle, an operating current flows through the coil of the UP relay 11, and then, the contact of the UP relay 11 switches over from a state of being in contact with the B side to a state of being contact with an A side.

In this case, the current from the battery power source 15 flows to the I UP direction going from the motor 9 and the terminal D of the DOWN relay 13 to the earth via the terminal A of the UP relay 11. In accordance with the current direction, the motor 9 make a forward rotation to a direction of closing the glass window. And then, during the ON-state of the UP switch 3, the contact of the UP relay 11 is kept at a state of being in contact with the A side; for this reason, the motor 9 continues to make a forward rotation. Thus, the glass window continues to be raised up. When the UP switch 3 is turned off by a passenger of the land vehicle, the contact of the UP relay 11 returns from the state of being in contact with the A side to a state of being contact with the B side. And then, the motor 9 is in a state that a current does not flow therethrough because it is not connected with the battery power source 15; for this reason, the motor 9 stops rotating. Therefore, the glass window is kept on a position at the point of time.

Figure 3C:
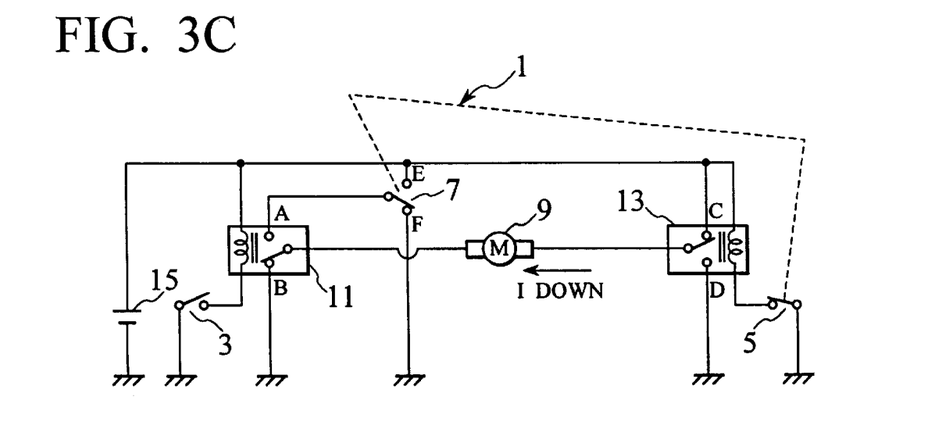
FIG. 3C is a circuit diagram when turning on a DOWN switch 3 of the control circuit 1 of the window according to the first embodiment.

FIG. 3C is a circuit diagram when the DOWN switch 5 is an ON-state.

When the DOWN switch 5 is turned on by a passenger of a land vehicle, an operating current flows through the coil of the DOWN relay 13, and then, the contact of the DOWN relay 13 switches over from a state of being in contact with the D side to a state of being contact with an C side.

In this case, the current from the battery power source 15 flows to the I DOWN direction going from the motor 9 and the terminal B of the UP relay 11 to the earth via the terminal C of the DOWN relay 13. In accordance with the current direction, the motor 9 make a reverse rotation to a direction of lowering the glass window. And then, during the ON-state of the DOWN switch 5, the contact of the DOWN relay 13 is kept at a state of being in contact with the C side; for this reason, the motor 9 continues to make a reverse rotation. Thus, the glass window continues to be lowered. When the DOWN switch 5 is turned off by a passenger of a land vehicle, the contact of the DOWN relay 13 returns from a state of being in contact with the C side to a state of being contact with the D side. Simultaneously, the interlocking switch 7 also returns from a state of being in contact with the F side to a state of being contact with the E side. And then, the motor 9 is in a state that a current does not flow therethrough because it is not connected with the battery power source 15; for this reason, the motor 9 stops rotating. Therefore, the glass window is kept on a position at the point of time.

Figure 4A:
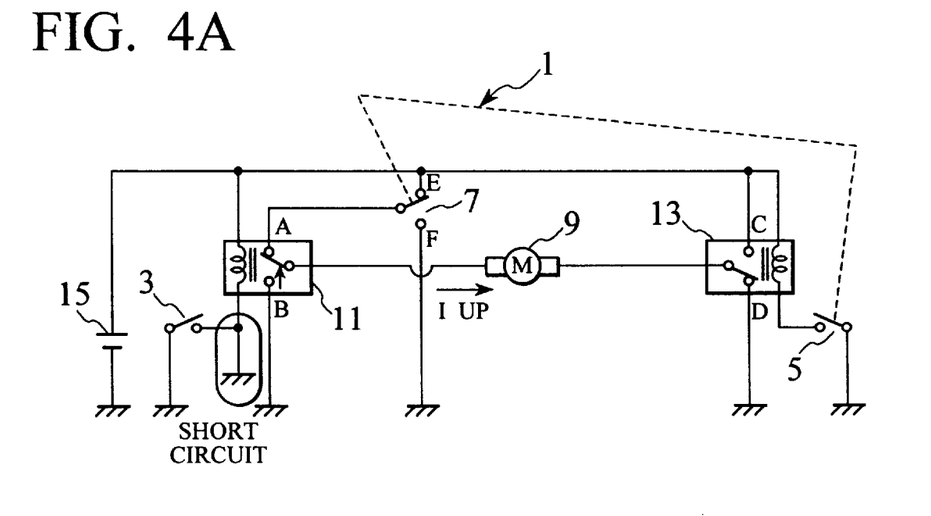
FIG. 4A is an equivalent circuit diagram in the case where a short circuit occurs in a connecting line between an UP relay 11 and the UP switch 3 of the control circuit 1 of the window according to the first embodiment.
Figure 4B:
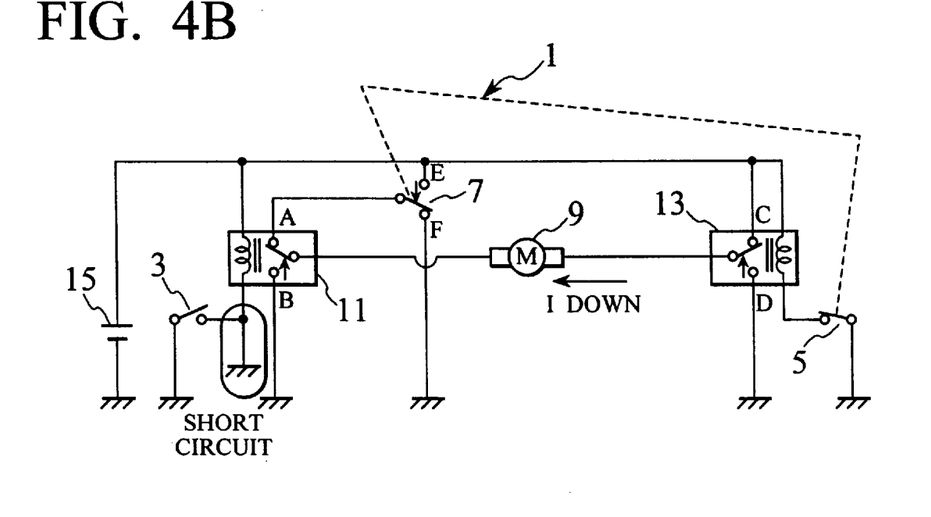
FIG. 4B is an equivalent circuit diagram when turning on the DOWN switch 5 of the control circuit 1 of the window according to the first embodiment.

Next, with reference to FIG. 4A and FIG. 4B, the following is a description on an operation of the control circuit 1 in the case where a short circuit occurs in a connecting line between the UP relay 11 and the UP switch 3 due to any causes, or in the case where the contact of the UP relay 11 is fixed to the A side.

FIG. 4A is an equivalent circuit diagram when a short circuit occurs in a connecting line between the UP relay 11 and the UP switch 3 due to any causes, or when the contact of the UP relay 11 is fixed to the A side.

this case becomes the same state as the UP switch 3 is turned on, and the contact of the UP relay 11 is kept at a state of being in contact with the side A. For this reason, as the UP switch 3 is in an ON-state, so the current from the battery power source 15 flows to the I UP direction going from the motor 9 and the terminal D of the DOWN relay 13 to the earth via the terminal A of the UP relay 11. In accordance with the current direction, the motor 9 make a forward rotation to a direction of raising up the glass window.

FIG. 4B is an equivalent circuit diagram when the DOWN switch 5 is in an ON-state.

When the DOWN switch 5 is turned on by a passenger of a land vehicle, an operating current flows through the coil of the DOWN relay 13, and then, the contact of the DOWN relay 13 switches over from a state of being in contact with the D side to a state of being contact with a C side. Simultaneously, the contact of the interlocking switch 7 switches over from a state of being in contact with the E side to a state of being contact with an F side, together with the operation of the DOWN switch 5.

In this case, the current from the battery power source 15 flows to the I DOWN direction going from the motor 9, the terminal A of the UP relay 11 and the terminal F of the interlocking switch 7 to the earth via the terminal C of the DOWN relay 13. In accordance with the current direction, the motor 9 make a reverse rotation to a direction of lowering the glass window. And then, during the ON-state of the DOWN switch 5, the contact of the DOWN relay 13 is kept at a state of being in contact with the C side; for this reason, the motor 9 continues to make a reverse rotation. Thus, the glass window continues to be lowered.

Therefore, according to this first embodiment, even in the case where the UP direction current is supplied to the motor when the UP switch 3 is not turned on, in accordance with the ON-operation of the DOWN switch 5, the UP direction current supplied to the motor is broken. And then, the DOWN direction current is supplied to the motor 9, so that the glass window can be lowered.

(Second Embodiment)

Next, a second embodiment of the present invention will be described below.

FIG. 5A to FIG. 5C, FIG. 6A and FIG. 6B are each a diagram showing a control circuit 21 of power window system for a land vehicle according to the second embodiment. In these figures, like reference numerals are used to designate the same part as the first embodiment, and the details thereof is omitted.

First, an operation when the control circuit of the land vehicle power window system is in a normal state will be described below with reference to FIG. 5A to FIG. 5C.

The features of the control circuit of the second embodiment lies in that an interlocking switch 23 is interposed between the UP relay 25 and the motor 9.

Figure 5A:
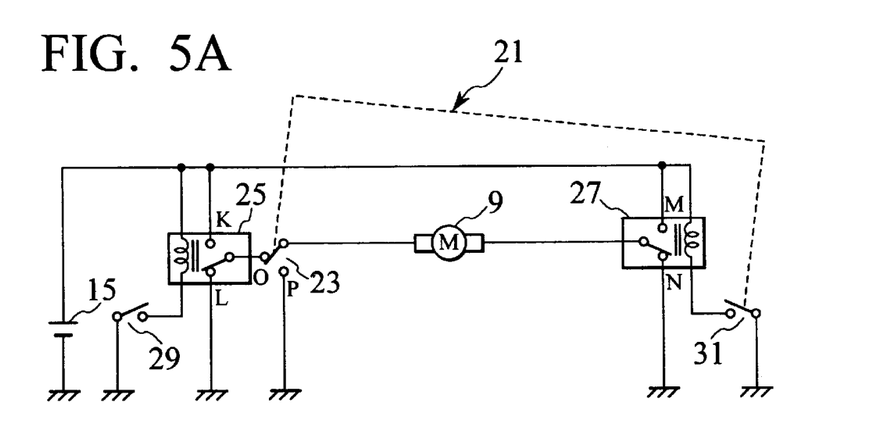
FIG. 5A is a circuit diagram showing a normal state of a control circuit 21 of a window according to a second embodiment of the present invention.

FIG. 5A is a circuit diagram when an UP switch 29 and a DOWN switch 31 are in an off-state.

When the UP switch 29 and the DOWN switch 31 are in an off-state, a contact of an UP relay 25 is kept at a state of being in contact with an L side; on the other hand, a contact of a DOWN relay 27 is kept at a state of being in contact with an N side. In this case, the motor 9 is in a state that a current does not flow therethrough because it is not connected with the battery power source 15; therefore, the motor 9 is not rotated.

Figure 5B:
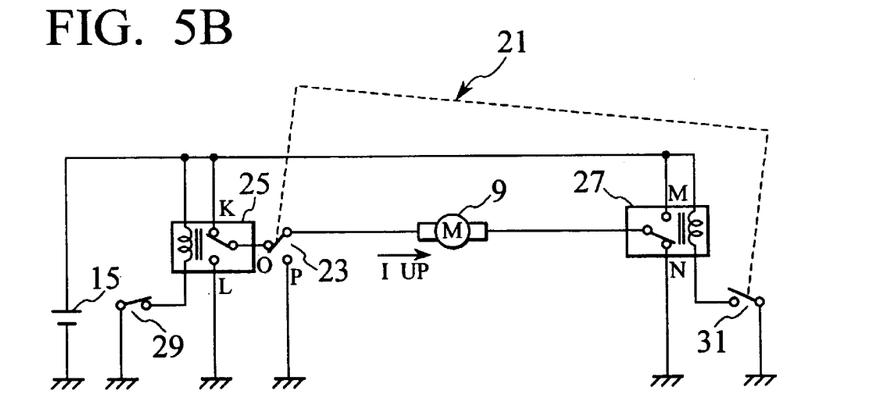
FIG. 5B is a circuit diagram when turning on an UP switch 29 of the control circuit 21 of the window according to the second embodiment.

FIG. 5B is a circuit diagram when the UP switch 29 is in an ON-state.

When the UP switch 29 is turned on by a passenger of a land vehicle, an operating current flows through the coil of the UP relay 25, and then, the contact of the UP relay 25 switches over from a state of being in contact with the L side to a state of being contact with a K side.

In this case, the current from the battery power source 15 flows to the I UP direction going from a terminal O of the interlocking switch 23, the motor 9 and the terminal N of the DOWN relay 27 to the earth via the terminal K of the UP relay 25. In accordance with the current direction, the motor 9 make a forward rotation to a direction of raising up the glass window. And then, during the ON-state of the UP switch 29, the contact of the UP relay 25 is kept at a state of being in contact with the K side; for this reason, the motor 9 continues to make a forward rotation. Thus, the glass window continues to be raised up. When the UP switch 29 is turned off by a passenger of a land vehicle, the contact of the UP relay 25 returns from a state of being in contact with the K wide to a state of being contact with the L side. And then, the motor 9 is in a state that a current does not flow therethrough because it is not connected with the battery power source 15; for this reason, the motor 9 stops rotating. Therefore, the glass window is kept on a position at the point of time.

Figure 5C:
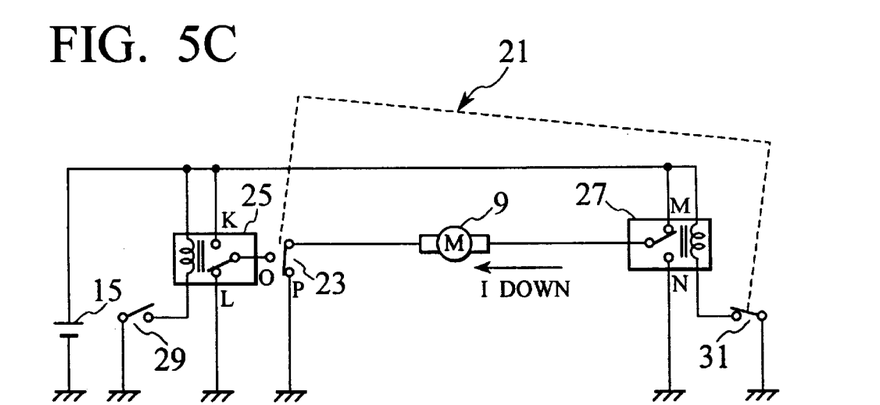
FIG. 5C is a circuit diagram when turning on a DOWN switch 31 of the control circuit 21 of the window according to the second embodiment.

FIG. 5C is a circuit diagram when the DOWN switch 31 is an ON-state.

When the DOWN switch 31 is turned on by a passenger of a land vehicle, an operating current flows through the coil of the DOWN relay 27, and then, the contact of the DOWN relay 27 switches over from a state of being in contact with the N side to a state of being contact with an M side. Further, simultaneously with the switching operation of the DOWN switch 31, the contact of the interlocking switch 23 switches over from a state of being in contact with the O side to a state of being contact with a P side.

In this case, the current from the battery power source 15 flows to the I DOWN direction going from the motor 9 and the terminal P of the interlocking switch 23 to the earth via the terminal M of the DOWN relay 27. In accordance with the current direction, the motor 9 make a reverse rotation to a direction of lowering the glass window. And then, during the ON-state of the DOWN switch 31, the contact of the DOWN relay 27 is kept at a state of being in contact with the M side; for this reason, the motor 9 continues to make a reverse rotation. Thus, the glass window continues to be lowered. When the DOWN switch 31 is turned off by a passenger of a land vehicle, the contact of the DOWN relay 27 returns from a state of being in contact with the M side to a state of being contact with the N side. Simultaneously, the interlocking switch 23 also returns from a state of being in contact with the P side to a state of being contact with the O side. And then, the motor 9 is in a state that a current does not flow therethrough because it is not connected with the battery power source 15; for this reason, the motor 9 stops rotating. Therefore, the glass window is kept on a position at the point of time.

Figure 6A:
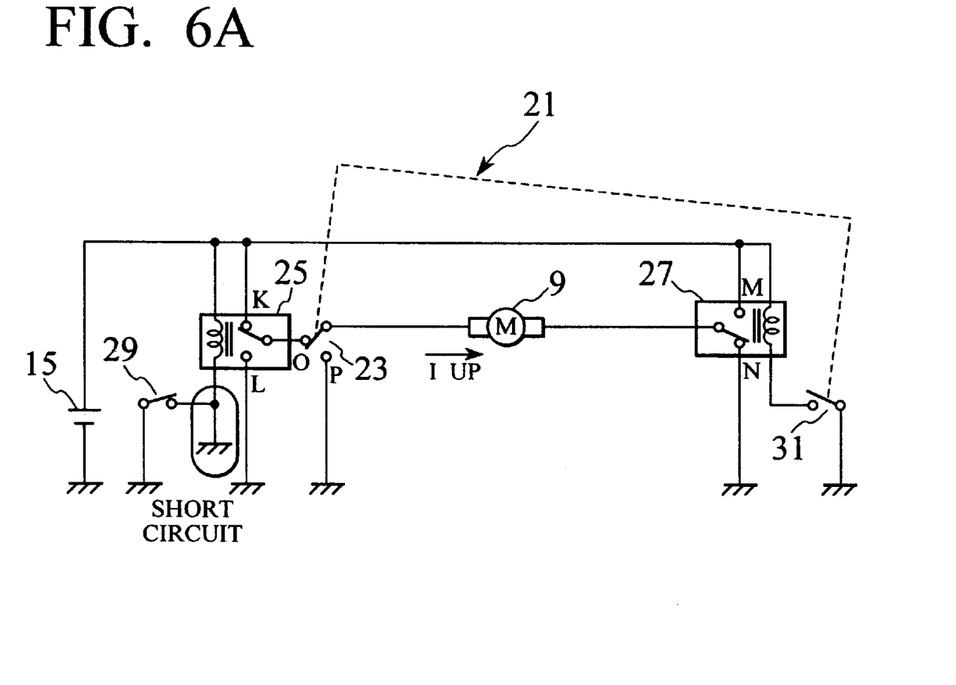
FIG. 6A is an equivalent circuit diagram in the case where a short circuit occurs in a connecting line between an UP relay 25 and the UP switch 29 of the control circuit 21 of the window according to the second embodiment.
Figure 6B:
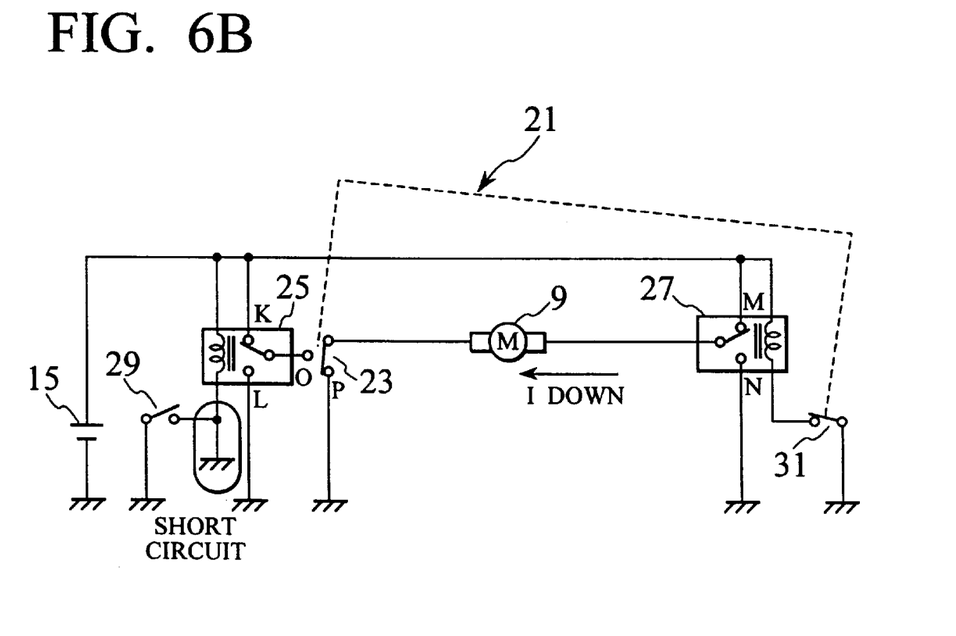
FIG. 6B is an equivalent circuit diagram when turning on the DOWN switch 31 of the control circuit 21 of the window according to the second embodiment.

Next, with reference to FIG. 6A and FIG. 6B, the following is a description on an operation of the control circuit in the case where a short circuit occurs in a connecting line between the UP relay 25 and the UP switch 29 due to any causes, or in the case where the contact of the UP relay 25 is fixed to the K side.

FIG. 6A is an equivalent circuit diagram when a short circuit occurs in a connecting line between the UP relay 25 and the UP switch 29 due to any causes, or when the contact of the UP relay 25 is fixed to the K side.

This case becomes the same state as the UP switch 29 is turned on, and the contact of the UP relay 29 is kept at a state of being in contact with the side K. For this reason, as the UP switch 29 is in an ON-state, so the current from the battery power source 15 flows to the I UP direction going from the terminal O of the interlocking switch 23, the motor 9 and the terminal N of the DOWN relay 27 to the earth via the terminal K of the UP relay 25. In accordance with the current direction, the motor 9 make a forward rotation to a direction of raising up the glass window.

FIG. 6B is an equivalent circuit diagram when the DOWN switch 31 is in an ON-state.

When the DOWN switch 31 is turned on by a passenger of a land vehicle, an operating current flows through the coil of the DOWN relay 27, and then, the contact of the DOWN relay 27 switches over from a state of being in contact with the N side to a state of being contact with the M side. Simultaneously with the switching operation of the DOWN switch 31, the contact of the interlocking switch 23 switches over form a state of being in contact with the O side to a state of being contact with a P side.

In this case, the current from the battery power source 15 flows to the I DOWN direction going from the motor 9 and the terminal P of the interlocking switch 23 to the earth via the terminal M of the DOWN relay 27. In accordance with the current direction, the motor 9 make a reverse rotation to a direction of lowering the glass window. And then, during the ON-state of the DOWN switch 31, the contact of the DOWN relay 27 is kept at a state of being in contact with the M side; for this reason, the motor 9 continues to make a reverse rotation. Thus, the glass window continues to be lowered.

Therefore, according to this second embodiment, even in the case where the UP direction current is supplied to the motor 9 when the UP switch 29 is not turned on, in accordance with the ON-operation of the DOWN switch 31, the UP direction current supplied to the motor is broken. And then, the DOWN direction current is supplied to the motor 9, so that the glass window can be lowered.

The above second embodiment has described the control circuit of the power window for land vehicles. The present invention is not limited to the control circuit of the power window, and also, is applicable to a sun roof for land vehicles or the like. Likewise, the sun roof can be close-driven or open-driven.

(Third Embodiment)

Figure 7:
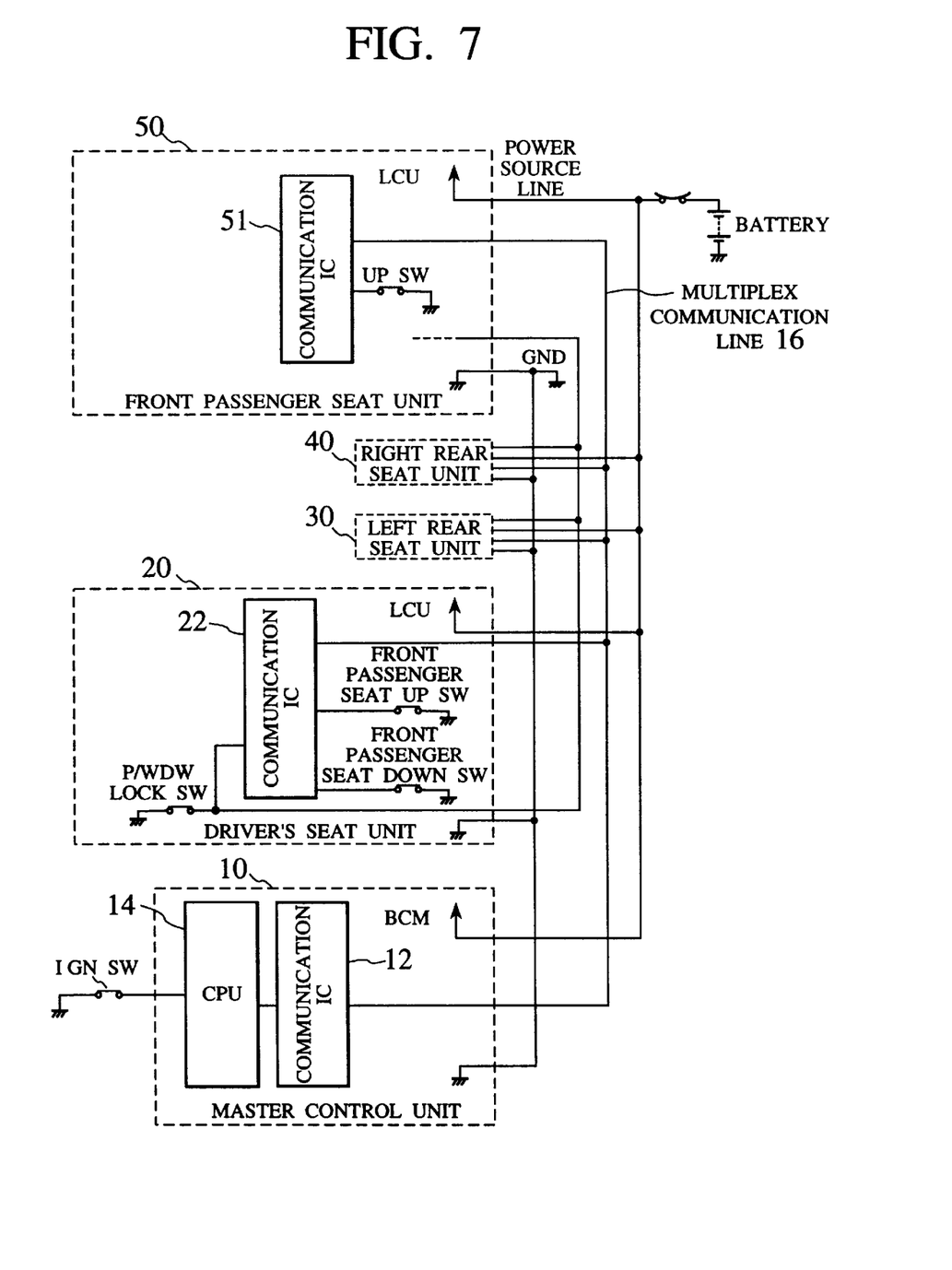
FIG. 7 is a circuit diagram showing a configuration of a power window system according to a third embodiment of the present invention.

FIG. 7 is a diagram showing a configuration of a power window system according to a third embodiment of the present invention.

As shown in FIG. 7, a master control unit 10 has a CPU 14 and a communication IC 12, and determines control mode or an open/close switch signal on the basis of the switch signal received from each unit and controls the entirety of system. A driver's seat unit 20, a left rear seat unit 30, a right rear seat unit 40 and a front passenger seat unit 50 have communication IC 12, 22, 31, 41 and 51, respectively in their interiors. These units are slave units which communicate the switch signal via a multiplex communication line 16 connected to their communication ICs. Also, the driver's seat unit 20, the left rear seat unit 30, a right rear seat unit 40 and the front passenger seat unit 50 make a communication with the master control unit 10 via the multiple communication line 16, and thereby, a multiplex communication system is constructed.

A P/WDW lock SW provided in the driver's seat unit 20 is connected with the communication IC 22. If the P/WDW lock switch is in a OFF-state, a terminal B of a relay 57 (cf. FIG. 8) becomes an open state. At this time, a P/WDW lock signal is outputted from the communication IC 22, and then, is once processed by the master control unit 10. Thereafter, the P/WDW lock signal is received in the communication IC 51 via the multiplex communication line 16. As a result, even if an UP_SW is operated, a motor 56 is not rotated; therefore, the window is not close-driven. On the other hand, if the P/WDW lock switch is in an ON-state, the communication IC is grounded on a GND, and when the UP_SW is operated, the motor 56 is rotated; therefore, the window can be open-driven.

Figure 8:
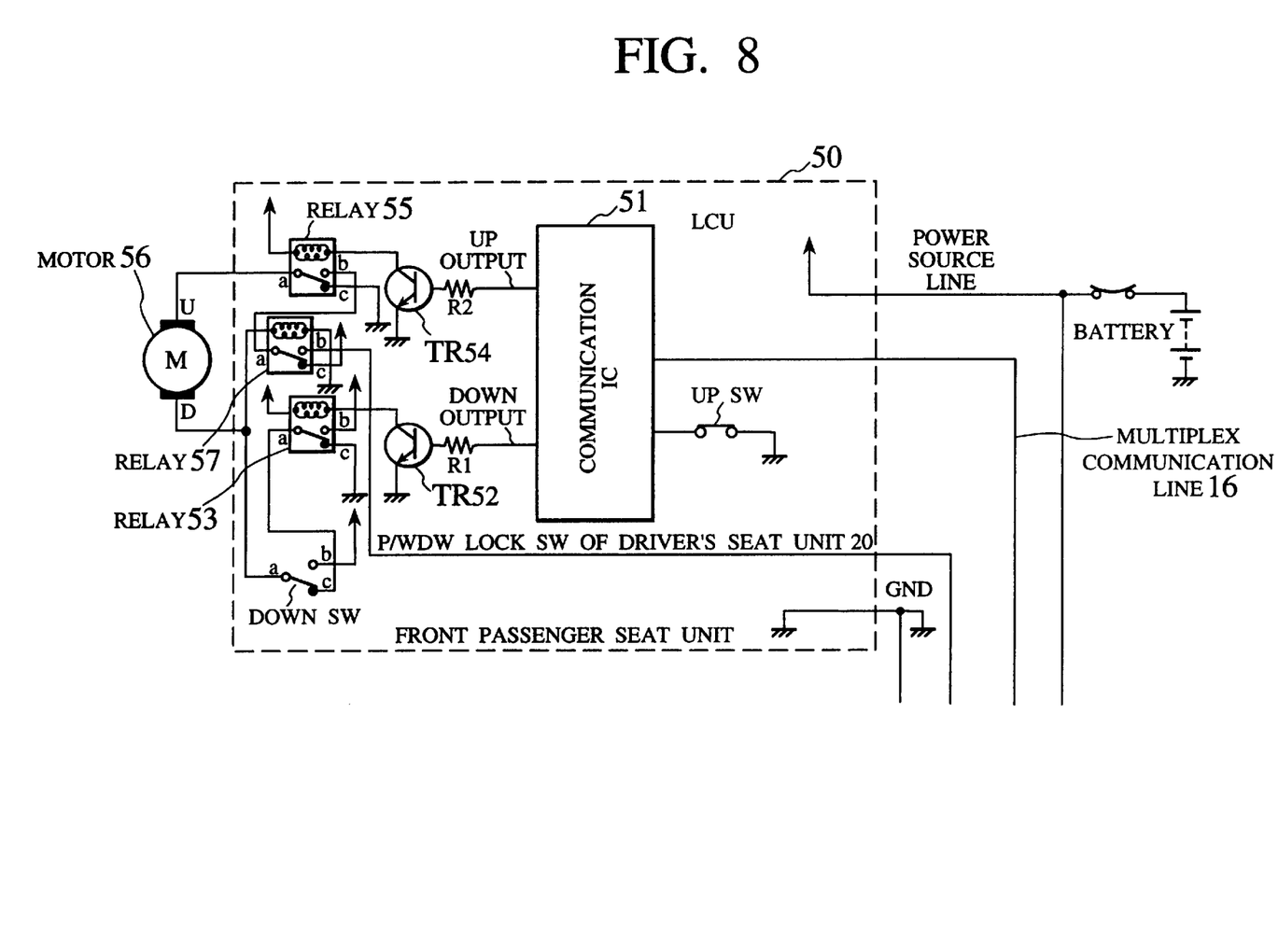
FIG. 8 is a view to explain an operation of a front passenger seat unit 50 in the power window system according to the third embodiment.

Next, FIG. 8 is a diagram showing a detailed configuration of the front passenger seat unit 50.

The front passenger seat unit 50 shown in FIG. 8 is characterized in the following matters. More specifically, a terminal "a" of an open-operation switch DOWN_SW, which comprises one circuit for forcedly open-driving the window, is connected to a connecting line between the terminal D of the motor 56 and a solenoid coil of a relay 57; on the other hand, a terminal "c" of the open-operation switch DOWN_SW is connected to a terminal "a" of a relay 53. Further, when an open switch signal is outputted from the communication IC 51, the terminal "a" of the relay 53 is switched over from GND to power source.

Next, the following is an explanation about the operation of the front passenger seat unit 50 shown in FIG. 8.

In order to close the window, when operating a front passenger seat up switch UP_SW of the driver's seat unit 20 or operating an up switch UP_SW of the front passenger seat unit 50, a close-switch signal is once transmitted from their communication ICs 21 and 51 to the master control unit 10 via the communication multiplex line 16. Next, the close-switch signal is returned from the master control unit 10 to the communication IC 51 of the front passenger seat unit 50. Subsequently, in accordance with an UP output (High level) outputted from the communication IC 51, a transistor TR 54 becomes an ON-state, and then, the contact of the relay 55 switches over from the terminal "c" to the terminal "b". As a result, a power is supplied to a terminal U of the motor 56 via the relay 57 and the relay 55, and then, a terminal D of the motor 56 is connected to the GND via the down switch DOWN_SW and the relay 53. Thus, the motor 56 is rotated to close-drive the window. At this time, an exciting current is not supplied to the relay 57 due to internal resistance of the exciting coil of the relay 57.

Meanwhile, when the passenger operated the down switch DOWN_SW of the front passenger seat unit 50, the terminal "a" of the down switch DOWN_SW is connected to the power source via the terminal "b" thereof. Thus, a power is supplied to the terminal D of the motor 56, while the terminal U of the motor 56 is connected to the GND via the terminal "c" of the relay 55 from the terminal "a" thereof, so that the motor 56 can be rotated so as to open-drive the window of the driver's seat door.

Further, when the communication IC 51 outputs an UP output, the down switch DOWN_SW is operated, and then, an exciting current is supplied to an internal coil of the relay 57 via the terminals "b" and "a" of the down switch DOWN_SW, and thus, the contact of the relay 57 is separated from the terminal "c" thereof. As a result, a power to the motor 56 for close-driving the window is broken, so that the window can be forcedly open-driven.

In order to open the window of the front passenger seat side, when operating a front passenger seat down switch DOWN_SW of the driver's seat unit 20, an open-switch signal is transmitted from the communication IC 21. The open-switch signal is processed by the master control unit 10, and then, is returned to the communication IC 51 of the front passenger seat unit 50. Next, in accordance with an DOWN output (High level) outputted from the communication IC 51, a transistor TR 52 becomes an ON-state, and then, the contact of the relay 53 switches over from the terminal "c" to the terminal "b". As a result, a power is supplied to the terminal D of the motor 56 via the relay 53 and the down switch DOWN_SW, and then, the terminal U of the motor 56 is connected to the GND via the relay 55. Thus, the motor 56 is rotated to open-drive the window.

The terminal "b" of the relay 57 is connected directly to the P/WDW lock SW provided in the driver's seat unit 20. However, the relay 57 can perform the aforesaid operation even when the switch state is in an OFF-state and an ON-state.

As described above, when the down switch DOWN_SW is open-operated, the window on the driver's seat side can be forcedly switched to the open-drive regardless of the operating state of the front passenger seat unit 50. As a result, even if a fault occurs in the multiplex communication system, the window can be open-driven in accordance with the necessity of the passenger.

In this third embodiment, the P/WDW lock SW of the driver's seat unit 20 and the terminal "b" of the relay 57 are connected. The terminal "b" of the relay 57 may be grounded.

(Fourth Embodiment)

Figure 9:
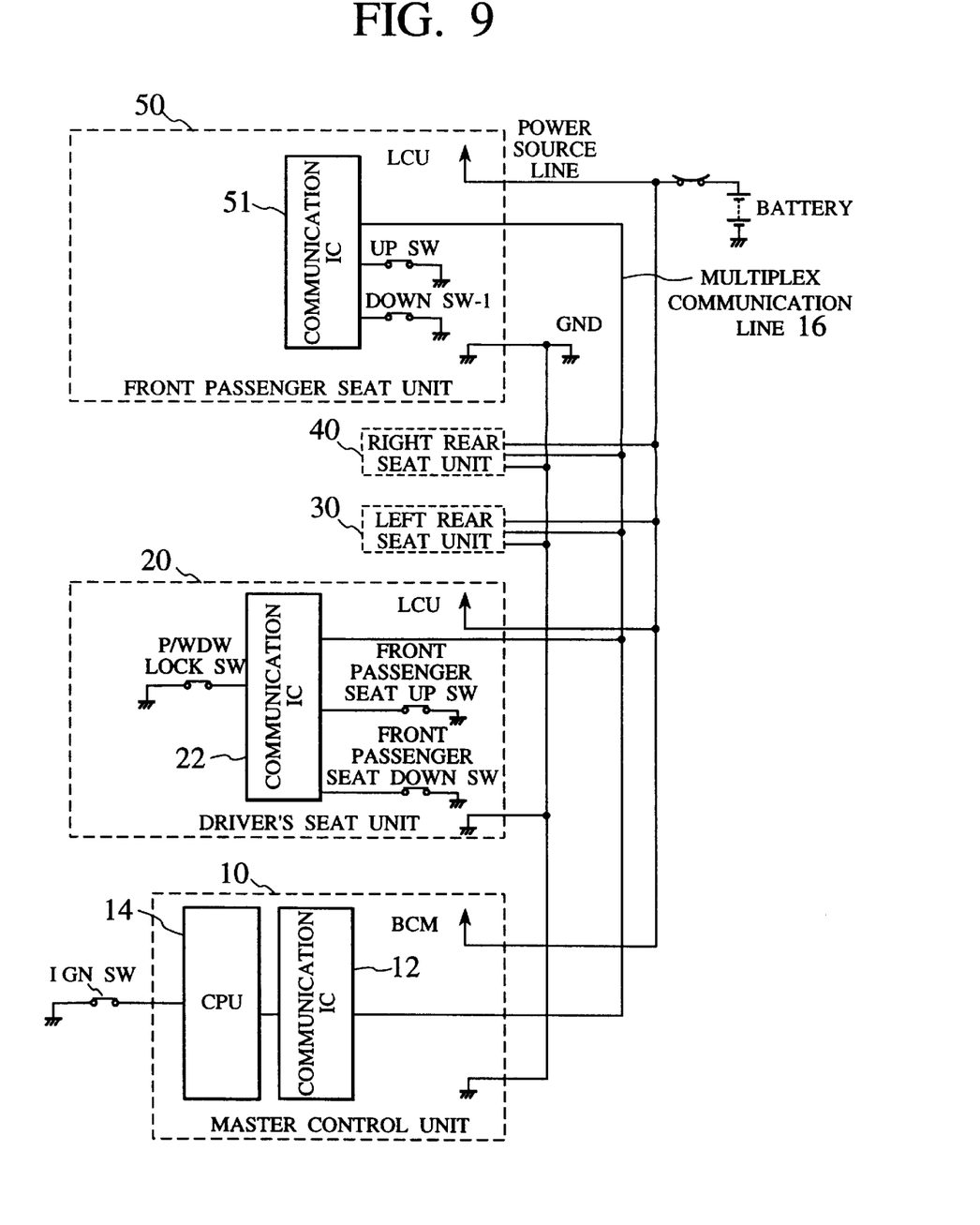
FIG. 9 is a circuit diagram showing a configuration of a power window system according to a fourth embodiment of the present invention.
Figure 10:
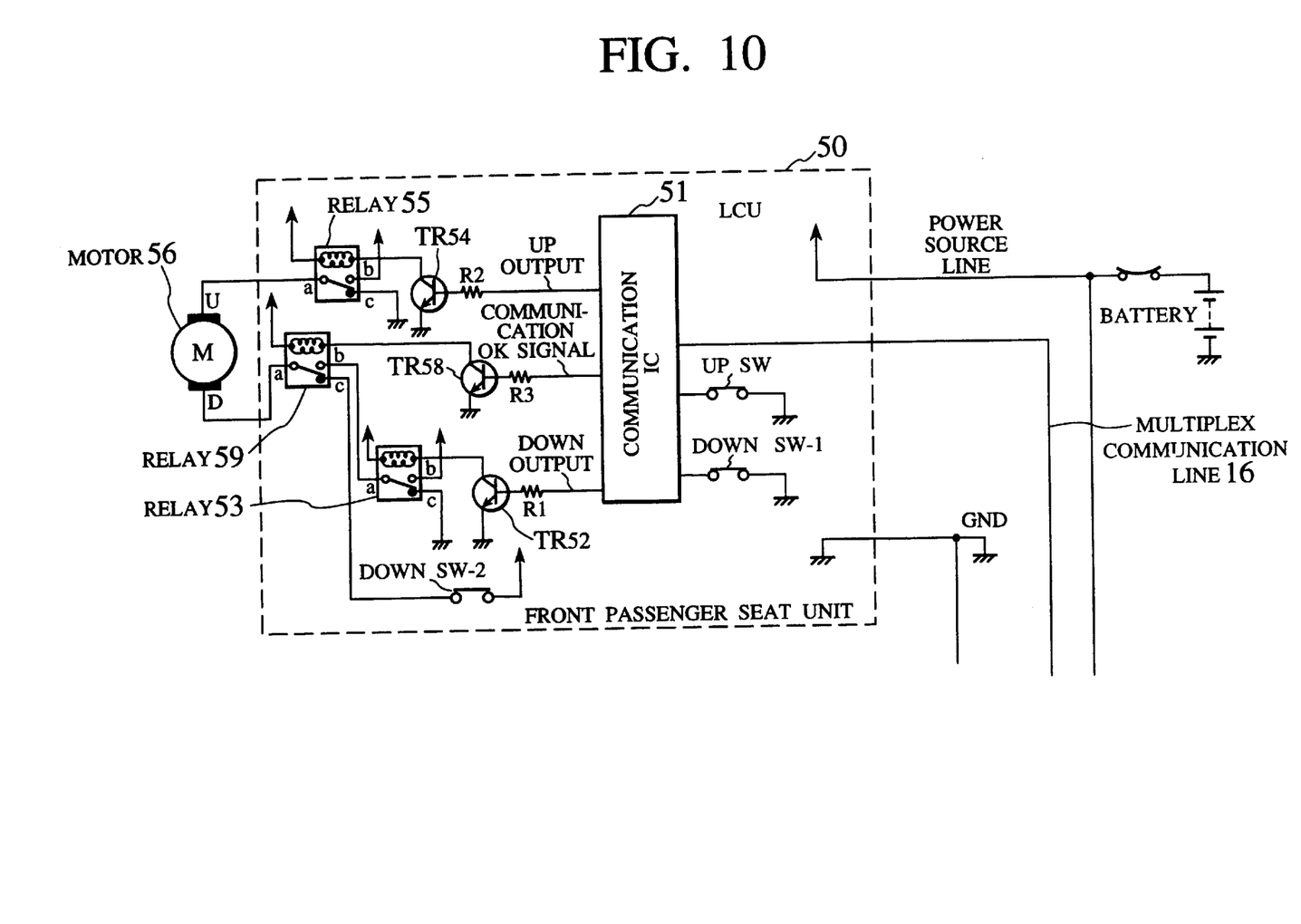
FIG. 10 is a diagram to explain an operation of a front passenger seat unit 50 in the power window system according to the fourth embodiment.

FIG. 9 is a diagram showing a configuration of a power window system according to a fourth embodiment of the present invention. FIG. 10 is a diagram showing a detailed configuration of a front passenger seat unit 50.

The front passenger seat unit 50 shown in FIG. 10 is characterized in that the communication IC 51 always outputs a High level communication OK signal (communication normal signal) when the multiplex communication system is in a normal communication state. Further, when the communication OK signal is a High level, a transistor TR 58 is on-operated, and the solenoid coil of the relay 59 is always excited, so that the terminal D of the motor 56 is connected to the terminal "a" of the relay 53 via the terminal "b" of the relay 59 from the terminal "a" thereof. In addition, the terminal "c" of the relay 59 is connected to one terminal of a down switch DOWN_SW-2, and the other terminal of the down switch DOWN_SW-2 is connected to the power source.

Next, the following is an explanation about the operation of the front passenger seat unit 50 shown in FIG. 10.

If a failure such as communication interruption of the multiplex communication line 16, a fault of the communication IC 51 or the like occurs in the multiplex communication system due to any causes, the communication OK signal becomes a Low level, and the transistor TR 58 becomes an OFF-state. As a result, the relay 59 is released from exciting the solenoid coil, the terminal D of the motor 56 is connected from the terminal "a" of the relay 59 to one terminal of the down switch DOWN_SW-2 via the terminal "c" of the relay 59.

The failure occurs in the multiplex communication system; for this reason, the transistor TR 54 becomes an OFF-state. As a result, a current is not applied to the solenoid coil of the relay 55. Thus, the terminal U of the motor 56 is grounded from the terminal "c" of the relay 55 to the GND via the terminal "a" thereof.

When the down switch DOWN_SW-2 is turned ON by the passenger, a power is supplied from the down switch DOWN_SW-2 to the terminal D of the motor 56 via the terminals "c" and "a" of the relay 59, and then, the motor 56 start to rotate. Thus, the door window on the front passenger seat side can be forcedly open-driven.

The CPU 14 of the master control unit 10 operates a logical add AND on the basis of the communication OK signal indicative that the multiplex communication system is in a normal state, and the lock OFF signal indicative of the lock signal state of the power window lock switch. And then, the AND output functions as the power window lock signal in a normal state.

As described above, in the case where a failure occurs in the multiplex communication system, when the down switch DOWN_SW-2 is on-operated, the door window on the front passenger seat side can be forcedly open-driven. As a result, even if a failure occurs in the multiplex communication system, the door window can be forcedly open-driven in accordance with the necessity of the passenger.

(Fifth Embodiment)

Figure 11:
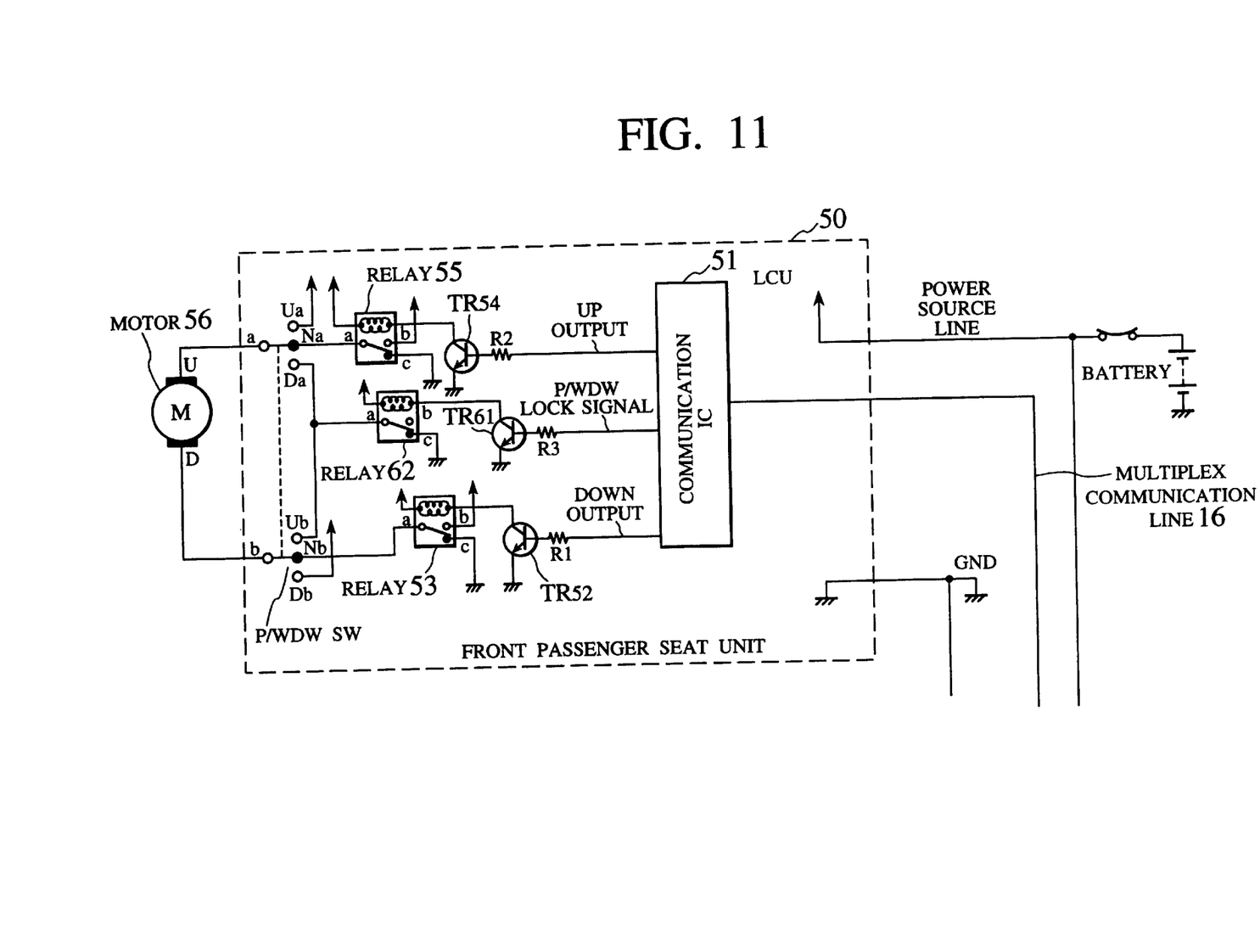
FIG. 11 is a diagram to explain an operation of a front passenger seat unit 50 in a power window system according to a fifth embodiment of the present invention.

FIG. 11 is a diagram showing a detailed configuration of a front passenger seat unit 50 of a power window system according to a fifth embodiment of the present invention. The front passenger seat unit 50 is applicable to the power window system shown in FIG. 9.

The front passenger seat unit 50 shown in FIG. 11 is characterized in the following matters. More specifically, an open/close switch signal operated by the driver's seat unit 20 and a P/WDW lock signal by the P/WDW lock SW are once processed by the master control unit 10, and thereafter, are received in the communication IC 51 via the multiplex communication line 16. Further, a front passenger seat switch P/WDW SW, which can make an interlocking operation, is provided on opposite sides the motor 56 so as to directly switch over a drive current direction of the motor 56.

When the P/WDW lock SW provided on the front passenger seat unit 20 is in a lock (ON)state, the P/WDW lock signal received by the communication IC 51 from the master control unit 10 via the multiplex communication line 16 becomes a High state; for this reason, a transistor TR 61 becomes an ON-state. As a result, a solenoid coil of a relay 62 is excited, and a terminal "a" of the relay 62 is in a state of being connected to a terminal "b" thereof. Thus, even if the front passenger seat switch P/WDW_SW is operated, the motor 56 is not driven.

Further, when the P/WDW_SW is in a neutral state Nb with respect to one terminal D of the motor 56, the contact "a" of the relay 53 switches over from the contact "c" to the contact "b" in accordance with the received open-switch signal; in other words, it switches over from the GND to the power source. On the other hand, when the P/WDW_SW is in a neutral state Na with respect to the other terminal U of the motor 56, the contact "a" of the relay 53 switches over from the contact "c" to the contact"b" in accordance with the received open-switch signal; in other words, it switches over the GND to the power source. As a result, the open/close switch signal operated by the driver's seat unit 20 is once processed by the master control unit 10, and thereafter, even if the communication IC 51 receives the signal via the multiplex communication line 16, the window can be open/close-driven.

Next, the following is an explanation about the operation of the front passenger seat unit 50 shown in FIG. 11.

If faults such as communication interruption, communication IC interruption and the like occur in the multiplex communication system due to any causes, the P/WDW lock signal from the master control unit 10 is not received. Therefore, the communication IC 51 processes the P/WDW lock signal as an OFF-state. Next, the transistor TR 61 becomes an OFF-state. As a result, the relay 62 becomes a state that a power is not supplied to the solenoid coil thereof, and then, the terminal "a" is grounded to the GND via the terminal "c" thereof.

When the P/WDW_SW of the front passenger seat unit 50 is open-operated by the passenger, a power is supplied from the terminal "Db" of the P/WDW_SW to the terminal D of the motor 56 via the terminal "b". On the other hand, the terminal U of the motor 56 is grounded to the GND via the terminals "a" and "Da" of the P/WDW SW and the terminals "a" and "c" of the relay 62. As a result, the motor 56 starts to rotate, and then, the door window on the front passenger seat side can be forcedly open-driven.

As described above, if a fault occurs in the multiplex communication system, when the P/WDW_SW is open-operated, he door window on the front passenger seat side can be forcedly switched over to a open-drive. As a result, even if a fault occurs in the multiplex communication system, the window can be forcedly open-driven in accordance with the passenger's necessity.

(Six Embodiment)

Figure 12:
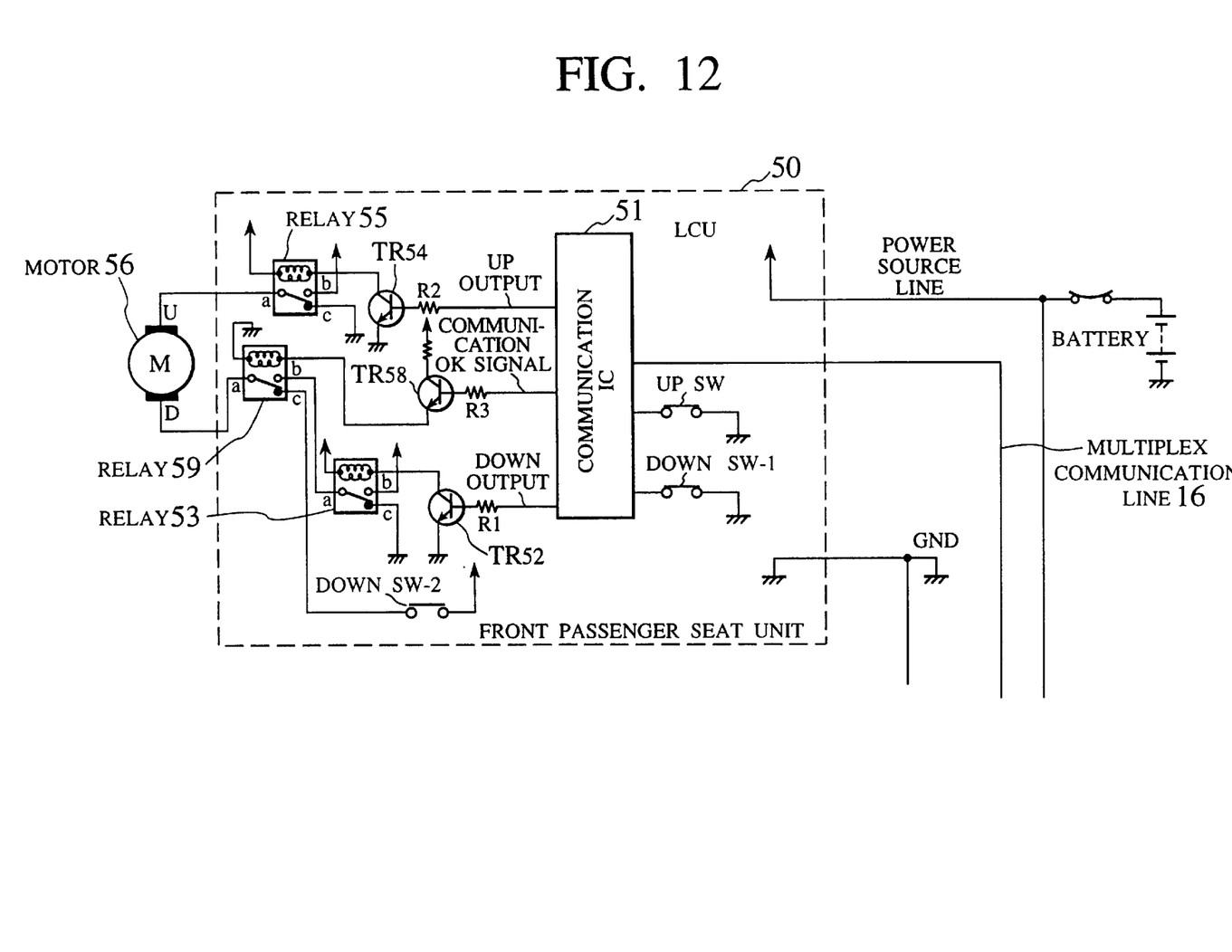
FIG. 12 is a circuit diagram showing a detailed configuration of a front passenger seat unit 50 in a power window system according to a sixth embodiment.

FIG. 12 is a diagram showing a detailed configuration of a front passenger seat unit 50 of a power window system according to a sixth embodiment of the present invention. The front passenger seat unit 50 is applicable to the power window system shown in FIG. 9.

The front passenger seat unit 50 shown in FIG. 12 is characterized in that a connecting configuration of the relay 59 and the transistor TR 58 used in the fourth embodiment is modified. More specifically, in the fourth embodiment, one terminal of the solenoid coil of the relay 59 is connected to the power source, and the other terminal thereof is connected to a collector of the transistor 58.

Meanwhile, in the sixth embodiment, one terminal of the solenoid coil of the relay 59 is connected to the GND, an the other terminal thereof is connected to an emitter of the transistor 58. As a result, when the communication OK signal outputted from the communication IC 51 is High level, the transistor 58 makes an ON-operation, and then, the solenoid coil of the relay 59 is always excited. Thus, the terminal D of the motor 56 is connected to the terminal "a" of the relay 53 via the terminals "a" and "b" of the relay 59.

In the above third to sixth embodiments, the operation of the front passenger seat unit 50 has been described for convenience of explanation; however, the present invention is not limited to the front passenger seat unit 50. In left rear seat unit 30 and the right rear seat unit 40, even if a fault occurs in the multiplex communication system, the window can be forcedly open-driven in accordance with the passenger's necessity, likewise.

In the above third to sixth embodiment, the power window has been described; however, the present invention is not limited to the power window, and is applicable to a sun roof for land vehicles or the like. Thus, the sun roof can be open/close-driven, likewise.

What is claimed is:

1. A control circuit for an opening/closing device in a vehicle, comprising;

a first contact switching over a first terminal of a motor for open-driving an opening/closing device provided in a vehicle from ground to a power source in accordance with an ON-operation of an open switch for open-operating said opening-closing device;

a second contact switching over a second terminal of said motor from ground to the power source in accordance with an ON-operation of a close switch for close-operating said opening/closing device; and an interlocking switch forcedly switching over said second terminal of said motor to ground when said ON-operation of said open switch is performed.

2. The control circuit for an opening/closing device in a vehicle according to claim 1, wherein said interlocking switch is provided between said power source and said second contact, or between said second contact and said second terminal of said motor.

* * * * *